May 12, 1959  J. E. PANZA  2,886,006
RELAY FOR AUTOMATIC CONTROL DEVICE
Filed Dec. 20, 1956

INVENTOR.
Joseph E. Panza,
BY Byron, Hume, Groen
& Clement
ATTYS

United States Patent Office 2,886,006
Patented May 12, 1959

2,886,006

RELAY FOR AUTOMATIC CONTROL DEVICE

Joseph E. Panza, Arlington Heights, Ill., assignor to The Powers Regulator Company, Skokie, Ill., a corporation of Illinois Application December 20, 1956, Serial No. 629,682

5 Claims. (Cl. 121—38)

This invention relates to a relay particularly adapted for use with a reversible automatic thermostat and by means of which only significant changes in control pressure will cause a change in the direction of response of the thermostatic device.

Modern air temperature control systems often provide both heating and cooling cycles for conditioning the air in a single enclosure. These systems necessitate thermostatic control arrangements which are adapted to respond to increases in temperature in the summer to activate the cooling cycle, i.e. reverse acting, and to decreases in temperature in the winter to activate the heating cycle, i.e. direct acting.

Originally, separate controls were used for each cycle, but due to considerations of size, efficiency and expense, the more recent concern has been with providing a single control device which is adapted to provide both direct and reverse acting responses to control both the heating and cooling cycle.

Such single control devices are usually provided with condition responsive means for controlling the direction of response. Pneumatic controls are normally used in such systems to regulate the temperature. An incident of the use of such controls is that the pressure in the main supply is greater when the heating cycle is set for operation than it is when the cooling cycle is so set. This variance in the main supply pressure provides a convenient medium for controlling the direction of response.

Feasibility, durability and expense of a single reversible automatic thermostat are quite dependent upon the type of relay which is used to translate the different pressures to control the direction of response. Heretofore such relays have utilized a plurality of valves, making them relatively bulky and rendering them less efficient and less applicable to the type of installation for which they were intended.

Therefore, it is a principal object of this invention to provide a sensitive relay for a reversible automatic thermostat, which relay uses a single valving member to translate the pressure variances in the main supply to condition the direction of response. In using pneumatic relays to control the direction of response a further problem is occasioned by the pressure fluctuations which occur from time to time in the main supply line. The relays shown in the prior art, such as that disclosed in the Joesting Patent No. 2,327,226 for example, respond to all changes in pressure without discrimination so that a response directly proportional to pressure variances is to be expected. This often results in premature and erroneous changes in the direction of response of the thermostat with consequent failure of the device to effectively respond to temperature changes. A further disadvantage of pneumatic relays which respond in a manner directly proportional to pressure variances is that the period of change over from direct to reverse acting and vice versa is relatively prolonged, and under certain conditions results in suspending the operation of the thermostat entirely.

Therefore, it is an additional object of this invention to provide a relay wherein the pressure within the control chamber is utilized to resist mere sudden pressure changes in the main supply line. Likewise, it is an object to provide a relay which is self-accelerating and which effects practically instantaneous change-over.

Further objects and advantages of this invention will become evident as the description proceeds and from an examination of the accompanying drawings which illustrate several embodiments of the invention and in which similar numerals refer to similar parts throughout the several views.

Figure 1:
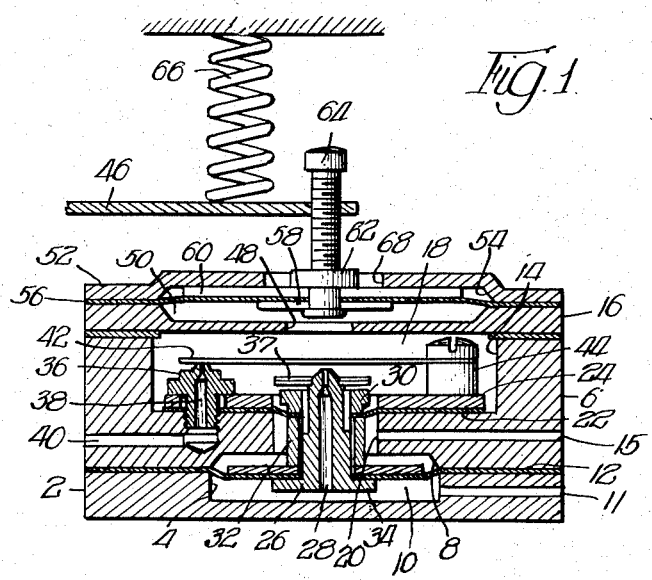
Figure 1 is a side elevation of an embodiment of the relay in vertical cross section, this relay being adapted to respond inversely to changes in supply pressure.

In Figure 1, a base member 2 provides a supporting base for the relay and is formed with a cylindrical recess 4. A housing block 6 is formed with a complementary recess 8 which is aligned with recess 4 to form a lower chamber 10 communicating with a source of fluid pressure through passage 11. A flexible diaphragm 12 is disposed in sealing relation between the housing block 6 and the base member 2 and extends across lower chamber 10.

Housing block 6 is formed with an upper recess 14 which forms upper chamber 18 when cover plate 16 is secured to the housing block. A cylindrical passage 20 extends between the two chambers and is separated from the lower chamber by diaphragm 12 and from the upper chamber by a second diaphragm 22 suitably secured to the lower portion of chamber 18 by means of an attachment plate 24. Passage 20 is vented through passage 15.

A nozzle means 26 extends through appropriate openings in the two diaphragms and is mounted for movement within passage 20. Nozzle means 26 includes a passage 28 extending into each chamber. A ring member 30 is threadedly secured to the upper end of nozzle 26 and serves to clamp diaphragm 22 against a sleeve 32 surrounding the main body of nozzle 26. Sleeve 32 in turn clamps diaphragm 12 against the lower annular shoulder 34 and nozzle 26. Thus, nozzle means 26 is adapted to move within passage 20 in response to the difference in pressure exerted within lower chamber 10 on the lower exposed nozzle surface including the lower diaphragm, and that exerted within the upper chamber 18 on the smaller upper exposed nozzle surface including the upper diaphragm.

Chamber 18 is provided with a vent nozzle 36 threadedly secured to housing block 6 and clamping the diaphragm 22 between attachment plate 24 and the lower portion of chamber 18. Vent nozzle 36 is provided with a passage 38 which communicates with the atmosphere through a bore 40.

A flapper valve member 42 is secured at one end to a post 44. The post may be adapted to provide additional force to clamp diaphragm 22 between attachment plate 24 and the lower portion of chamber 18. The other end of the flapper valve is biased into contact with vent nozzle 36 which provides communication between chamber 18 and the atmosphere. The intermediate portion of the flapper valve is located so that it may be contacted by the nozzle 26 to shut off communication between chambers 18 and 10 through passage 28 and be lifted from vent nozzle 36 to vent chamber 18. The leaf spring member 37 normally urges the nozzle 26 away from the flapper valve 42 as shown in Figure 1.

Figure 2:
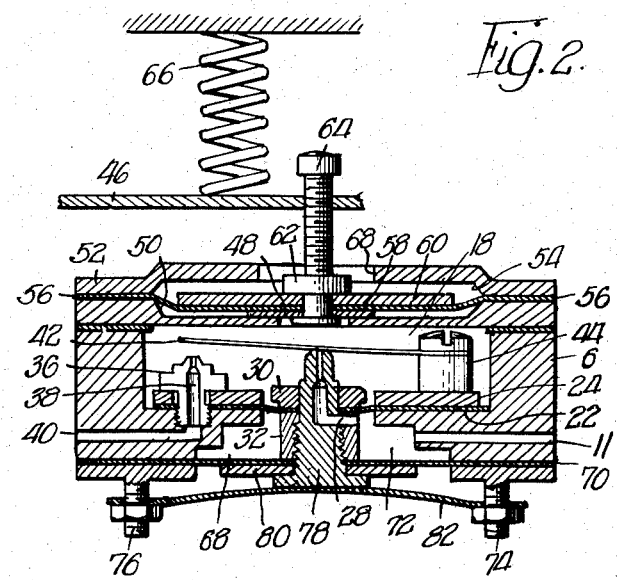
Figure 2 is a side elevation of another embodiment of the relay in vertical cross section, the relay being adapted to respond directly to changes in supply pressure.

In both of the embodiments shown in both Figures 1 and 2, the pressure within the upper chamber 18 is used to control the movement of a pivoted control arm 46 such as that used to control the direction of response of a reversible automatic thermostat of the type shown in the co-pending application of David H. Thorburn, Serial No. 615,371 filed October 11, 1956. To accomplish this, cover plate 16 is formed with a bore 48 and a recess 50. A second cover plate 52 is formed with an aligned recess 54 and is adapted to clamp the ends of a diaphragm 56, which extends across recess 50, to the first cover plate 16. Diaphragm 56 is provided with stiffening plates 58 and 60 clamped on opposite sides thereof by the clamping and abutting member 62. Threaded adjustment member 64 is received into one end of arm 46 and is adapted to be adjusted relative thereto. Adjusting member 64 is pressed into contact with abutment member 62 by means of a spring 66 appropriately mounted. The second cover plate 52 is provided with an opening 68 allowing the upper side of diaphragm 56 to be exposed to atmospheric pressure.

In operation, chamber 10 received fluid under pressure through passage 11. When this pressure is relatively low, the force on the underside of the nozzle is insufficient to overcome the force exerted by leaf spring 37. In this lower position the passage 28, through the nozzle, communicates with both chamber 10 and chamber 18, with the result that chamber 18 achieves substantially the same pressure as is present within chamber 10. This pressure in chamber 18 is exerted on the underside of diaphragm 56 which rises against the force of spring 66 to move control arm 46.

Minor fluctuations of supply pressure will exert additional force on the underside of nozzle 26, however, the residual pressure in chamber 18 acts upon the upper portion of the nozzle to resist these fluctuations, and although net movement occurs, the nozzle must move through a distance to contact the flapper, thus rendering the relay relatively insensitive to minor fluctuations.

When the supply pressure increases and the additional force exerted on the underside of the nozzle 26 exceeds that exerted on the smaller upper portion of the nozzle, the nozzle rises against the force of leaf spring 37. When the nozzle 26 contacts flapper valve 42 the intermediate portion of flapper valve 42 shuts off communication between the chambers and simultaneously the end of flapper valve 42 is lifted from vent nozzle 36 to immediately reduce the pressure within chamber 18. When this pressure is thus initially reduced, the difference in pressure between the two chambers is immediately increased, accelerating the upward motion of the nozzle 26. This instantaneous acceleration assures that there will be no period during which the response of the relay to supply pressures is suspended, that is, ineffective. When the pressure within chamber 18 is thus reduced, diaphragm 56 is urged to lowermost position by spring 66 moving control arm 46 with it.

In this position, the relay is relatively insensitive to supply pressure fluctuations in that the nozzle has to move the distance between the nozzle and the flapper before the relay will change over. In addition to this, it is to be noted that the residual pressure on the upper portion of the nozzle resists supply pressure changes on the underside of the nozzle.

When the supply pressure decreases, the nozzle 26 is urged downwardly by leaf spring 37. When the nozzle recedes, vent nozzle 36 is closed and the passage 28 opened simultaneously. This results in increasing the pressure in chamber 18 which in turn acts upon the upper portion of nozzle 26 to accelerate its movement to the lowermost position.

Another embodiment of this invention is shown in Figure 2 in which the pressure within the upper chamber is increased in response to increased pressures in the lower chamber. In this figure the housing block 6 is formed with a substantially recessed portion 68. A diaphragm 70 extends across recess 68 to form chamber 72. Diaphragm 70 is held to housing block 6 by means of attachment members 74 and 76. A nozzle member 78 is secured to an upper diaphragm 22 in the same manner as is shown in Figure 1. In Figure 2, nozzle means 78 is secured to diaphragm 70 by means of a sleeve member 32 which clamps the diaphragm to stiffening plate 80 located on the lower annular shoulder of nozzle 78. Nozzle member 78 is provided with a passage 28 for providing communication between chambers 72 and 18. A spring member 82 is appropriately attached to attachment members 74 and 76 and normally urges nozzle 78 against flapper valve 42 so as to close off communication between the chambers and to vent chamber 18. Attachment members 74 and 76 are adjustable in height so as to vary the compressive force on spring 82. This allows the adjustment to be made to cause the relay change over at various supply pressures. This allows a selective adjustment to be made to cause the relay to change over at pre-determined supply pressures. Spring 37 in Figure 1 may also be provided with such an adjustment feature.

In operation chamber 72 receives fluid pressure through passage 11. When this pressure is relatively low the relay assumes the position shown in Figure 2 whereby chamber 18 is in communication with the atmosphere through vent nozzle 36. In this position the diaphragm 56 is urged to the lowermost position by spring member 66, control arm 46 being moved accordingly. As the pressure increases in chamber 72, nozzle member 78 moves downwardly against the force exerted by spring 82. When nozzle 78 recedes to a certain point, flapper valve 32 will close nozzle 36 preventing chamber 18 from being vented, and simultaneously, nozzle 78 will recede from the intermediate valving surface of flapper valve 42 and the pressure within chamber 18 will be increased. The initial increase in pressure in chamber 18 results in the application of additional force to the upper side of nozzle 78, accelerating the movement thereof to a lowermost position.

When the pressure within chamber 18 is thus increased, diaphragm 56 will be moved to an uppermost position against the force of spring 66, moving control arm 46 accordingly.

When the supply pressure decreases, nozzle 78 will rise and contact flapper valve 42 terminating communication between the chambers 72 and 18 through passage 28 and opening nozzle 13 to vent chamber 18. This reduction in pressure within chamber 18 will cause the motion of nozzle 78 to accelerate to the uppermost position.

In the drawings and specification, there has been set forth preferred embodiments of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

What is claimed is:

1. A relay for a thermostatic device comprising a first chamber adapted to be supplied with fluid under pressure, a second chamber, a passage between said chambers, nozzle means mounted for movement within said passage and communicating with each chamber, a first diaphragm secured to said nozzle means to form a portion of said first chamber, a second diaphragm secured to said nozzle means to form a portion of said second chamber, said first portion being greater than said second portion, an exhaust passage within said second chamber, an elongated valving surface in the path of movement of said nozzle and normally closing said exhaust passage, and a biasing means for holding said nozzle out of contact with said valving surface until the difference in the pressures exerted on said portions reaches a predetermined value.

2. A relay for a thermostatic device comprising a first chamber adapted to be supplied with fluid under pressure, a second chamber, a passage between said chambers, nozzle means mounted for movement within said passage and communicating with each chamber, a first diaphragm secured to said nozzle means to form a portion of said first chamber, a second diaphragm secured to said nozzle to form a portion of said second chamber, said first portion being larger than said second portion, an exhaust passage within said second chamber, an elongated valving surface in the path of movement of said nozzle normally closing said exhaust passage, and a spring biasing means for urging said nozzle into contact with said valving surface to open said exhaust passage until the differences in the pressures exerted on said portions reaches a predetermined value.

3. A relay for a thermostatic device comprising a first chamber adapted to be supplied with fluid under pressure, a second chamber, a passage between said chambers, nozzle means mounted for movement within said passage and communicating with each chamber, a first diaphragm secured to said nozzle means to form a portion of said first chamber, a second diaphragm secured to said nozzle to form a smaller portion of said second chamber, an exhaust passage within said second chamber, a flapper valve within said second chamber in the path of movement of said nozzle and normally closing said exhaust passage, and a spring biasing means for normally holding said nozzle out of contact with said valving surface, whereby said second chamber will attain a pressure substantially equal to the pressures in said first chamber when relatively low, and will attain atmospheric pressure when the pressure in said first chamber is relatively high, the movement of said nozzle means being accelerated to open said exhaust passage when the pressure in said second chamber is initially decreased, and accelerated to close said exhaust passage when the pressure in said second chamber is initially increased.

4. A relay for a thermostatic device comprising a first chamber adapted to be supplied with fluid under pressure, a second chamber, a passage between said chambers, a nozzle means mounted for movement within said passage and communicating with each chamber, a first diaphragm secured to said nozzle to form a portion of said first chamber, a second diaphragm secured to said nozzle to form a smaller portion of said second chamber, an exhaust passage within said second chamber, a flapper valve within said second chamber in the path of movement of said nozzle and normally closing said exhaust passage, and a spring biasing means for normally holding said nozzle into contact with said valving surface to open said exhaust passage, whereby said second chamber will attain a pressure substantially equal to the pressures in said first chamber when relatively high, and will attain atmospheric pressure when the pressure in said first chamber is relatively low, the movement of said nozzle means being accelerated to open said exhaust passage when the pressure in said second chamber is initially increased and accelerated to close said exhaust passage when the pressure within said second chamber is initially decreased.

5. A relay for a thermostatic device comprising a first chamber adapted to be supplied with fluid under pressure, a second chamber, a passage between said chambers, nozzle means mounted for movement within said passage and communicating with each chamber, a first diaphragm secured to said nozzle means for supporting the same and to form a portion of said first chamber, a second diaphragm secured to said nozzle for supporting the same and to form a portion of said second chamber, said first portion being greater than said second chamber, and a valving arrangement within said second chamber adapted to be moved by said nozzle arrangement to control the exhaust passage and the fluid flow from said first chamber to said second chamber through said nozzle.

References Cited in the file of this patent
UNITED STATES PATENTS

| | | |
|---|---|---|
| 1,141,975 | Osborne | June 8, 1915 |
| 2,618,155 | Conner | Nov. 18, 1952 |
| 2,653,578 | Moore | Sept. 29, 1953 |